March 9, 1971 — M. L. HOFFMAN — 3,568,458
GAS SEPARATION BY PLURAL FRACTIONATION WITH INDIRECT HEAT EXCHANGE
Filed Nov. 7, 1967 — 2 Sheets-Sheet 1

MICHAEL L. HOFFMAN
INVENTOR.

BY Max Goldin

ATTORNEY

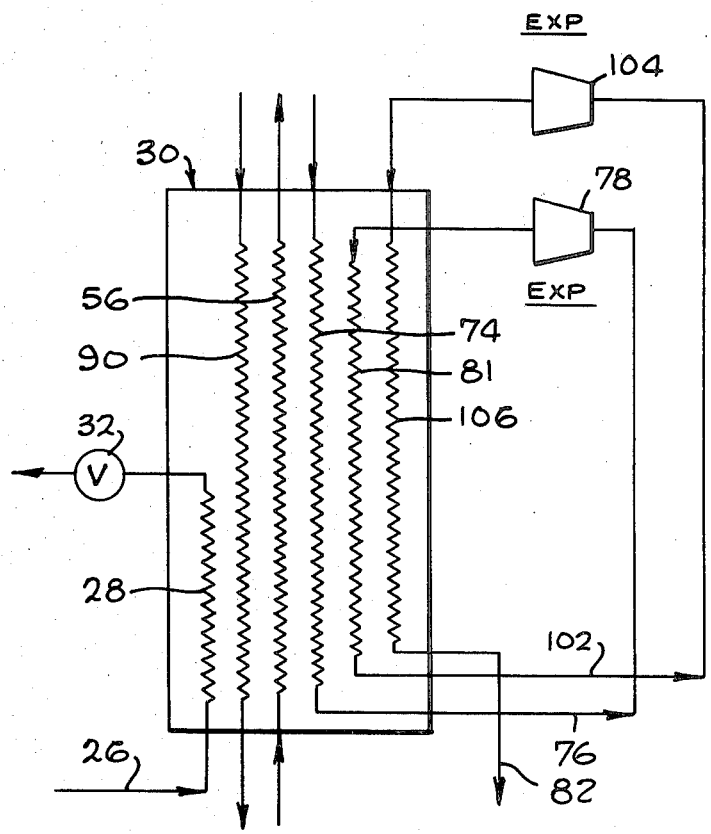

United States Patent Office 3,568,458
Patented Mar. 9, 1971

3,568,458
GAS SEPARATION BY PLURAL FRACTIONATION WITH INDIRECT HEAT EXCHANGE
Michael L. Hoffman, Beverly Hills, Calif., assignor to McDonnell Douglas Corporation, Santa Monica, Calif.
Filed Nov. 7, 1967, Ser. No. 681,284
Int. Cl. F25j 3/02
U.S. Cl. 62—31                            14 Claims

ABSTRACT OF THE DISCLOSURE

Method and system particularly designed for separating methane from mixtures of nitrogen and methane, which involves, according to one embodiment, separating a mixture of methane and nitrogen in an initial separation stage to produce said nitrogen vapor and a methane-rich liquid of methane and nitrogen, feeding the methane-rich liquid to a fractionating column in heat exchange relation with the initial separation stage, withdrawing methane in substantially pure form from the bottom of the fractionating column, separating a portion of the last-mentioned liquid methane, subcooling the separated portion of liquid methane, throttling the subcooled liquid methane and passing it through a condenser in heat exchange relation with nitrogen withdrawn as overhead from the initial separation zone, to condense such nitrogen and vaporize the methane, supplying condensed liquid nitrogen as reflux to the top of both the initial separation zone and fractionating column, and passing nitrogen vapor and vaporized methane from the condenser into heat exchange relation with liquid methane refrigerant for subcooling same before the liquid methane is throttled and passed to the nitrogen condenser. The nitrogen and methane vapor streams from the condenser are also passed in heat exchange relation with the methane-rich liquid containing nitrogen, from the bottom of the initial separation zone, prior to its being throttled and introduced as feed into the fractionating column. Also, preferably the vaporized nitrogen from the condenser is brought in several passes in series, in heat exchange relation with the liquid methane refrigerant for subcooling same, employing work expansion after one or more of such passes for greater efficiency. The associated initial separation zone and main fractionating column in the system are operated under conditions to effect a "differential distillation in the column.

---

Figure 1:
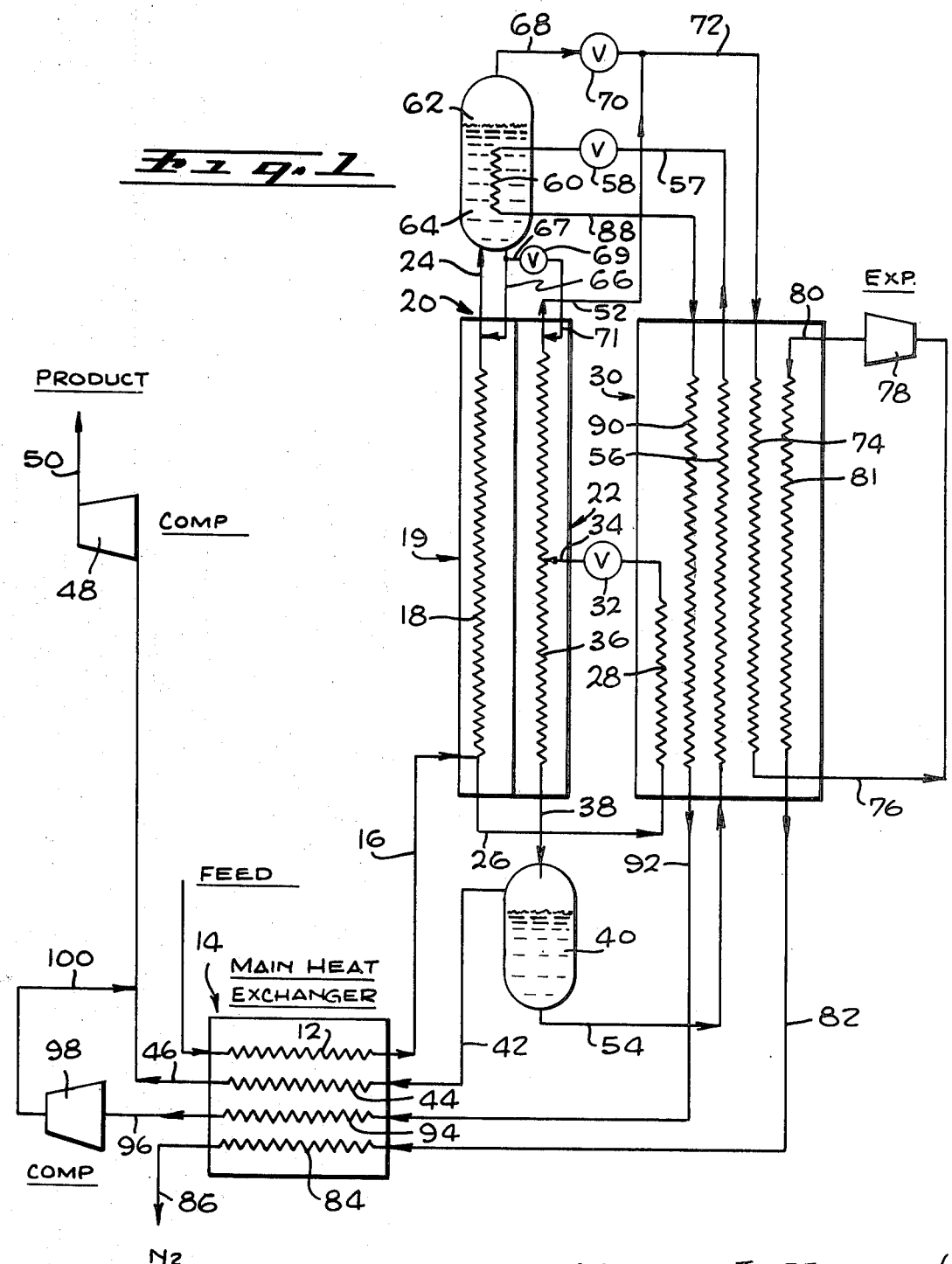

This invention relates to the separation of the components of mixtures of nitrogen and hydrocarbons, particularly mixtures of nitrogen and methane, by low temperature rectification, and is particularly concerned with procedure for the separation of methane in substantially pure form from mixtures thereof with nitrogen, in multiple separation zones which are suitably associated in heat exchange relation, employing in the separation zones the principles of "differential" distillation, and with the system for carrying out such procedure.

The processing or separation of the components of natural gas containing low-boiling hydrocarbons and nitrogen, such as, for example, mixtures of a major proportion of methane and minor proportion of nitrogen, to recover substantially pure hydrocarbon, such as methane, for use as a low cost fuel which can be readily transported by pipeline and stored, has assumed considerable importance. By the term hydrocarbons or methane "in substantially pure form" as employed herein, is intended to denote such hydrocarbons or methane of at least 95% purity, and preferably of the order of 97% or greater.

According to the invention, there is provided a process and system for the separation of a mixture of gases consisting essentially of a low-boiling hydrocarbon and nitrogen, which comprises the steps of cooling a compresesd feed mixture of said gases approximately to its saturation temperature, introducing the cooled compressed mixture into an initial separation zone in heat exchange relation with a fractionating column, and effecting a separation in said zone, withdrawing nitrogen as overhead from said initial separation zone, withdrawing from the bottom of the initial separation zone a nitrogen-hydrocarbon liquid mixture enriched in hydrocarbon, introducing said last-mentioned mixture as feed into the fractionating column intermediate the ends thereof, effecting a separation of such last-mentioned mixture in the column, withdrawing hydrocarbon in substantially pure liquid form from the bottom of the fractionating column, separating a portion of the last-mentioned liquid hydrocarbon, subcooling said separated portion of liquid hydrocarbon, throttling and further cooling such separated subcooled portion of liquid hydrocarbon, passing the throttled and further cooled hydrocarbon through a condenser in heat exchange relation with nitrogen withdrawn as overhead from the initial separation zone, to condense said nitrogen and vaporizing the hydrocarbon, introducing condensed nitrogen as reflux into the initial separation zone and the fractionating column, withdrawing nitrogen vapor from the condenser, throttling such nitrogen vapor, and passing the vaporized hydrocarbon and the throttled nitrogen vapor into heat exchange relation with said separated portion of liquid hydrocarbon for subcooling same as aforesaid.

Thus, briefly, according to the process and system of the present invention, a portion of the substantially pure liquid hydrocarbon, e.g., liquid methane, withdrawn from the bottom of the fractionating column, is used as refrigerant by suitable subcooling and throttling, to condense nitrogen overhead from the initial separation zone, which is operated at substantially higher pressure than the fractionating column. To carry out such subcooling, nitrogen vapor from the condenser is throttled and together with vaporized hydhrocarbon or methane from the cndenser, is passed into a separate heat exchanger in heat exchange relation with the liquid hydrocarbon or methane refrigerant before the refrigerant is throttled to low pressure and passed to the nitrogen condenser.

The hydrocarbon-rich crude liquid mixture withdrawn from the initial separation zone is throttled, approximately to the pressure in the main fractionating column, prior to introduction as feed therein, and the vapor streams of nitrogen and hydrocarbon or methane employed for subcooling the liquid hydrocarbon refrigerant, are also used to subcool such crude hydrocarbon-rich liquid, prior to throttling of said hydrocarbon-rich liquid and introduction thereof into the fractionating column.

In preferred practice, the above-noted nitrogen vapor from the condenser is recycled in a plurality of passes in series in indirect heat exchange relation with the liquid hydrocarbon refrigerant for subcooling same, the nitrogen preferably being work expanded to reduce the temperature thereof prior to one or more of said passes in such recycling operation.

Thus, it is seen according to the invention that a portion of the liquid hydrocarbon, e.g., liquid methane, product, upon further cooling by cold hydrocarbon and nitrogen vapors produced in the process, functions essentially as the sole refrigerant for condensing nitrogen from the high pressure or initial separation zone, for use thereof as reflux in such initial separation zone, and since the initial separation zone is in heat exchange relation with the fractionating column, the nitrogen reflux supplied to the top of the initial separation zone generally furnishes the requisite condensing duty in the upper portion of the fractionating column, and heat from the lower portion of the initial separation zone furnishes the requisite reboil heat for the lower portion of the fractionating column. Since nitrogen reflux is required in the fractionating column, a portion of the condensed nitrogen from the top of the initial separation zone, is throttled to the pressure in the fractionating column, and such throttled nitrogen is then introduced as reflux into the top of the fractionating column.

The separation in the main fractionating column utilizing heat exchange between the initial separation zone and the fractionating column, and employing suitable apparatus for this purpose, results in effecting a differential distillation of the vapor-liquid mixture in the fractionating column, thereby increasing the efficiency thereof.

The process and system of the invention have the advantages of requiring relatively few operational steps and a minimum of components, thereby substantially reducing maintenance and initial equipment costs. Of particular significance, due to the employment of a portion of the liquid hydrocarbon, e.g., liquid methane, product as refrigerant, for supplying reflux, in conjunction with the utilization of differential distillation, and the requirement of only a moderate compression of the feed gas mixture entering the initial separation zone, a substantial reduction in the power requirement for the separation of a given quantity of a substantially pure hydrocarbon product such as methane, is afforded, as compared to prior art processes for carrying out the same separation. Thus, a power requirement of only about 50% that of conventional prior art processes can be attained by carrying out the process of the present invention for obtaining methane in 97% purity from an initial mixture of 70% methane and 30% nitrogen, when the initial feed mixture was compressed to 200 p.s.i.a. and it is desired to obtain methane product at as high a pressure as possible, and substantially without any off-setting equipment cost increase.

Preferably, cooling of the initial compressed gas mixture to its saturation point prior to introduction into the initial separation zone is effected by passing the feed in countercurrent heat exchange relation with cold product and waste gas streams.

The invention will be understood more clearly by the description below of certain embodiments of the invention taken in connection with the accompanying drawing wherein:

FIG. 1 is a schematic representation of a preferred form of separation system for separating substantially pure methane from a mixture of methane and nitrogen, and FIG. 2 illustrates a modification of the system of FIG. 1.

Referring to FIG. 1 of the drawing, a natural gas feed mixture containing 70% methane and 30% nitrogen compressed to a pressure of 200 p.s.i. and at a temperature of 80° F. is cooled to −194° F., its approximate saturation temperature, by passage of such compressed feed gas through coil 12 of a main heat exchanger 14 in countercurrent heat exchange relation with cold product and waste gas streams, as will be described more fully hereinafter.

The resulting compressed feed mixture at −194° F. is introduced at 16 into the lower end of one or more passages 18 of an initial separation zone 19 incorporated in a unit 20 including a main fractionating column portion 22. In the passages 18 of the initial separation zone a separation of the feed mixture occurs and essentially pure nitrogen vapor at a pressure of about 200 p.s.i. and a temperature of −262° F. is withdrawn at 24 from the passages at the top of said zone and a methane-rich liquid mixture of methane and nitrogen containing about 93% methane, is withdrawn at 26 from the passages 18 at the bottom of the initial separation zone, at a pressure of about 200 p.s.i. and a temperature of about −194° F. Such liquid mixture is passed through a coil 28 of a heat exchanger 30 in heat exchange relation with cold methane and nitrogen vapors, as described more fully below, to subcool the methane-rich liquid mixture, and such liquid mixture is flashed by the throttling valve 32 to a pressure of 100 p.s.i., the pressure in the fractionating column portion 22, and a reduced temperature of −220° F., and the resulting flashed fluid is introduced at 34 into one or more vapor-liquid passages 36 in the fractionating column portion 22. It will be noted that such passages 36 extend substantially the entire length of the unit 20 in heat exchange relation with the initial separation zone passages 18.

In the vapor-liquid passages 36 of the fractionating column 22, methane in substantially pure form, but containing a minor amount of nitrogen, is withdrawn as product from the bottom of the column at 38, at a temperature of −208° F., and is introduced into a vapor-liquid separator 40, and a major portion of the methane in separator 40 is withdrawn at 42 and is passed through coil 44 of the main heat exchanger 14 in heat exchange relation with incoming compressed feed gas mixture at 12 for cooling same, and the exiting methane vapor at 46, having a pressure of 95 p.s.i. and a temperature of 60° F. can be compressed at 48 to a desired pressure, e.g., 800 p.s.i., for passage of the methane product through a pipeline as indicated at 50. Substantially pure nitrogen vapor is withdrawn as overhead at 52 from the fractionating column passages 36.

A portion, e.g., about 15 to about 35%, say 25%, of the methane product is withdrawn in liquid form at 54 from the vapor-liquid separator 40, and is passed through coil 56 of the heat exchanger 30 in countercurrent heat exchange relation with cold nitrogen and methane vapor streams, as described below, to subcool such portion of liquid methane, and the exiting subcooled liquid methane at 57 at a temperature of about −255° F. is throttled at 58 to a reduced pressure of about 10 p.s.i. and a reduced temperature of about −265° F., and the exiting throttled methane is passed through coil 60 of a nitrogen condenser 62 in heat exchange relation with high pressure nitrogen passed at 24 from passages 18 of the initial separation zone 19, into the condenser 62, and causing condensation of the nitrogen therein, as indicated at 64. A portion of the liquid nitrogen from the condenser 62 is then conducted at 66 back into the upper ends of passages 18 to supply reflux in the initial separation zone 19, and also to provide sufficient refrigeration to supply condensing duty in the upper portion of the main fractionating column 22, and a portion 67 of the liquid nitrogen from the condenser is throttled at 69 to reduce the pressure of the nitrogen to the pressure in the main fractionating column portion 22, about 100 p.s.i., and such throttled nitrogen is then introduced as reflux at 71 into the upper end of the vapor-liquid passages 36 in the main fractionating column portion 22. Generally, the major portion of the liquid nitrogen from the condenser 62 is conducted at 66 into the upper ends of the passages 18 of the initial separation zone 19, as described above.

Nitrogen overhead vapor at 68 from the condenser 62 is then throttled through valve 70 to a pressure of about 100 p.s.i. and a reduced temperature of about −270° F., and is combined with nitrogen overhead at 52 from the upper ends of the passages 36 of the main fractionating column 22. The exiting combined nitrogen vapor at 72 is then passed through coil 74 of the heat exchanger 30 in heat exchange relation with liquid methane in coil 56 and with the methane-rich liquid mixture of nitrogen and methane feed in coil 28, for subcooling such liquids, and the exiting nitrogen at 76 is then introduced into an expander or turbine 78. The work expanded nitrogen at 80 reduced in pressure to about 20 p.s.i. and to a temperature of about −315° F. is then passed through a second coil or pass 81 in heat exchanger 30 to provide further refregeration for subcooling the crude liquid feed in coil 28 and the compressed liquid methane refrigerant in coil 56, and then exiting nitrogen at 82 is the passed through coil 84 of the main heat exchanger 14 for cooling incoming compressed feed gas mixture at 12, and the exiting waste nitrogen containing about 0.5% methane, is discharged at 86.

The methane in coil 60 of the nitrogen condenser 62 is vaporized therein, and the exiting methane vapor at 88 is passed through coil 90 of the heat exchanger 30 in countercurrent heat exchange relation with the compressed crude methane-rich liquid in coil 28, and the compressed liquid methane refrigerant in coil 56, to further aid in subcooling same to provide required refrigeration, and the exiting heated methane vapor at 92, now heated to a temperature of −210° F., conducted through coil 94 of the main heat exchanger 14 to aid in cooling compressed gas feed mixture at 12, and the exiting methane vapor at 96 at a pressure of 7 p.s.i. and a temperature of 60° F. is compressed at 98 to a pressure of 95 p.s.i. and is passed at 100 into admixture with the main methane product stream leaving the main heat exchanger at 46.

It will be seen from the above that the vaporized nitrogen at 74, from the initial separation zone 19 and the fractionating column 22, and the vaporized methane at 90 from the nitrogen condenser, supply sufficient cooling for subcooling the liquid methane refrigerant at 56 before the latter is throttled at 58 to the low pressure required to condense the nitrogen in condenser 62 for supplying the requisite nitrogen reflux in the upper end of the initial separation zone 19, as well as in the fractionating column 22, and since the initial separation zone is in heat exchange relation with the main column 22, the refrigeration afforded by such reflux in separation zone 19 provides the additional requisite condensing duty in the upper end of the fractionating column 22.

Reboiling duty is provided in the lower portion of the passages 36 of the fractionating column 22 by the heat provided in the lower portion of the passages 18 of the initial separation zone 19, which are in heat exchange relation with such passages 36.

Hence, it is seen that the process and system described above and shown in FIG. 1 provide a relatively simple system employing a minimum of components, with the condensing and reboiling duty of the associated initial separation zone 19 and the main fractionating column 22 closely matched. The mixture being separated in passages 18 of the initial separation zone and which is in heat exchange relation with the mixture being separated in passages 36 of the column 22, functions as a heat pumping fluid to provide continuous incremental addition of heat to the lower portion of the fractionating column 22 and continuous incremental removal of heat from the upper portion of column 22, resulting in a continuous heat transfer along passages 36 of column 22 between the fluid in passages 18 and the vapor-liquid mixture in the column passages 36, and a non-adiabatic differential distillation in the column. In this manner, equilibrium is much more closely approached throughout column 22 and a more efficient distillation therein occurs.

Further, the power requirement for the system of the invention as illustrated in FIG. 1, is substantially reduced, thereby substantially increasing the efficiency of said system over prior art processes and systems.

In FIG. 2 there is illustrated a modification of the system of FIG. 1, and wherein the cold vapor nitrogen at 74 is twice expanded during passage through the heat exchanger 30 in heat exchange relation with the liquids passing through coils 28 and 56 for subcooling same. Thus, referring to FIG. 2, the nitrogen at 76 which has been heated to a temperature of −220° F. by passage through coil 74, is expanded in the first expander or turbine 78 to a reduced temperature of −260° F. and a reduced pressure of 40 p.s.i., and the exiting nitrogen from coil 81, at 102 is again heated to a temperature of about −220° F., is introduced into a second expander or turbine 104, and the expanded nitrogen now cooled to a temperature of −260° F. and reduced to a pressure of about 20 p.s.i., is again passed via coil 106 of heat exchanger 30 in countercurrent heat exchange relation with the liquids in coils 28 and 56 for subcooling same. The exiting heated nitrogen at 82 is then passed through coil 84 of the main heat exchanger, as described above and illustrated in FIG. 1.

The heat exchange passages or constructions 18 of the initial separation zone 19, and 36 of the fractionating column 22, contained within the unit 20, can be in the form of a unitary plate-fin heat exchanger (not shown), wherein the passages or channels 18 of the initial separation zone or stripping section 19 are arranged in indirect heat exchange relation with the passages or channels 36 bearing the liquid-vapor mixture being separated in the fractionating column 22. The channels 18 and 36 can be constructed in the manner of a series of perforated fins, producing the effect of distillation column trays. This is a known type of heat exchanger arrangement described in International Advances in Cryogenics, volume 10, 1965. A heat exchanger arrangement or construction of this type is also disclosed in the copending application Ser. No. 572,135, filed Aug. 12, 1966, of James D. Yearout, now Pat. No. 3,508,412, and which is incorporated herein by reference. Since such heat exchanger arrangements or construction per se form no part of the present invention, they are not shown herein. Although such a plate-fin type of heat exchanger arrangement is preferably employed, any other suitable form of heat exchanger apparatus can be employed in providing the unit 20 containing the initial separation zone 19 and the fractionating column portion 22 in indirect heat exchange relation with each other, as described above and shown in FIGS. 1 to 4, so as to effect the above-described differential distillation in the fractionating column 22 and in the initial separation zone 19.

It will be understood that the system described above including the temperatures and pressures set forth are only illustrative and are not intended as limitative of the invention.

Feed mixtures which can be advantageously separated to provide substantially pure hydrocarbon product at high pressure according to the invention, include compositions containing from about 10 to about 60% nitrogen and from about 40 to about 90% methane. As previously noted, and as applied in the system described above and illustrated in the drawings, the system is particularly advantageous for separating substantially pure methane from natural gas mixtures containing about 70% methane and about 30% nitrogen.

While I have described particular embodiments of my invention for the purpose of illustration, it should be understood that various additional modificatitons and adaptatioщs thereof may be made within the spirit of the invention, and within the scope of the appended claims.

I claim:

1. A process for the separation of a mixture of gases consisting essentially of a low-boiling hydrocarbon and nitrogen, which comprises the steps of cooling a compressed feed mixture of said gases approximately to its saturation temperature, introducing said cooled compressed mixture into an initial fractional zone attached in side-by-side indirect heat exchange relation with a fractionating column, and effecting a separation in said zone, withdrawing nitrogen as overhead from said initial fractionation zone, withdrawing from the bottom of said initial fractionation zone a nitrogen-hydrocarbon liquid mixture enriched in hydrocarbon, introducing said last-mentioned mixture as feed into said fractionating column intermediate the ends thereof, said initial fractionation zone being in indirect heat exchange relation with said fractionating column along the entire length of said fractionating column, effecting a non-adiabatic differential distillation in said column and a separation of said last-mentioned mixture in said column, withdrawing hydrocarbon in substantially pure liquid form from the bottom of said fractionating column, separating a portion of said last-mentioned liquid hydrocarbon, subcooling said separated portion of liquid hydrocarbon, throttling and thereby further cooling said separated subcooled portion of liquid hydrocarbon, passing said throttled and further cooled hydrocarbon through a condenser in heat exchange relation with nitrogen withdrawn as overhead from said initial fractionation zone, to condense said nitrogen and vaporizing said hydrocarbon, introducing condensed nitrogen as reflux into said initial fractionation zone and said fractionating column, withdrawing nitrogen vapor from said condsener, throttling and thereby further cooling said nitrogen vapor, and passing said vaporized hydrocarbon and said throttled nitrogen vapor into heat exchange relation with said separated portion of liquid hydrocarbon for subcooling same as aforesaid.

2. A process as defined in claim 1, wherein said fractionation in the initial separation zone is carried out at about the pressure of the compressed feed mixture, and said separation in said fractionating column is out at an intermediate pressure lower than the pressure in said initial fractionation zone, and including throttling said hydrocarbon enriched nitrogen-hydrocarbon liquid mixture withdrawn from said initial fractionation zone, approximately to the pressure in said main fractionating column, prior to introducing said last-mentioned mixture as feed into said fractionating column.

3. A process as defined in claim 1, wherein said separation in said initial fractionation zone is carried out at about the pressure of said compressed feed mixture and said separation in said main fractionating column is carried out at an intermediate pressure lower than the pressure in said initial fractionation zone, and including subcooling said hydrocarbon enriched nitrogen-hydrocarbon liquid mixture withdrawn from said initial fractionation zone, by passage of said vaporized hydrocarbon and said throttled nitrogen vapor into heat exchange relation with said hydrocarbon enriched mixture, and throttling said subcooled hydrocarbon enriched liquid mixture prior to introducing same as feed into said main fractionating column.

4. A process as defined in claim 1, wherein said throttled nitrogen vapor is work expanded and further cooled during passage of said nitrogen vapor in heat exchange relation with said separated portion of liquid hydrocarbon for subcooling same.

5. A process as defined in claim 1, wherein said throttled nitrogen vapor is recycled in several passes in series in heat exchange relation with said separated portion of liquid hydrocarbon for subcooling same, said nitrogen vapor being work expanded and cooled at least once prior to the respective recycling passes.

6. A process as defined in claim 1, wherein said condensed liquid nitrogen is introduced as reflux into said initial fractionation zone, and wherein a portion of said condensed liquid nitrogen is throttled prior to introducing same as reflux into said fractionating column.

7. A process as defined in claim 1, including passing exiting throttled and heated nitrogen vapor and heated vaporized hydrocarbon, and passing liquid hydrocarbon withdrawn from the bottom of said fractionating column, all into heat exchange relation with said compressed gas mixture for cooling same prior to introduction thereof into said initial fractionation zone.

8. A process as defined in claim 1, wherein said hydrocarbon is methane.

9. A process as defined in claim 1, wherein said mixture of low-boiling hydrocarbon and nitrogen gases is a nitrogen-methane gas mixture consisting of about 70% methane and about 30% nitrogen, said nitrogen-methane feed mixture being initially compressed to about 200 p.s.i.

10. A process as defined in claim 1, wherein said mixture of low-boiling hydrocarbon and nitrogen gases is a nitrogen-methane gas mixture consisting of about 70% methane and about 30% nitrogen, said nitrogen-methane feed mixture being initially compressed to about 200 p.s.i., said fractionation in said initial separation zone is carried out at about the pressure of said compressed feed mixture and said separation in said main fractionating column is carried out at an intermediate pressure lower than the pressure in said initial fractionation zone, and including subcooling said methane-enriched nitrogen-methane liquid mixture withdrawn from said initial fractionation zone, by passage of said vaporized methane and said throttled nitrogen vapor into heat exchange relation with said methane-enriched mixture, and throttling said subcooled methane-enriched liquid mixture prior to introducing same as feed into said main fractionating column, and wherein a portion of said condensed liquid nitrogen is throttled prior to introducing same as reflux into said fractionating column, and wherein said throttled nitrogen vapor is recycled in several passes in series in heat exchange relation with said separated portion of liquid methane for subcooling same, said nitrogen vapor being work expanded and cooled at least once prior to the respective recycling passes.

11. A process as defined in claim 10, including passing exiting throttled and heated nitrogen vapor and heated vaporized methane, and passing liquid methane withdrawn from the bottom of said fractionating column, all into heat exchange relation with said compressed gas mixture for cooling same prior to introduction thereof into said initial fractionation zone, and compressing exiting methane product to about 800 p.s.i.

12. A system for the separation of a mixture of gases consisting essentially of a low-boiling hydrocarbon and nitrogen, which comprises means forming an initial fractionation zone, a fractionating column, said initial fractionation zone being attached in side-by-side indirect heat exchange relation with said column, a first vertically extending passage means for passing said gas mixture along said initial fractionation zone in indirect heat exchange relation with said column, a second vertically extending passage means in said fractionating column for separating a vapor-liquid mixture therein, said first passage means extending in indirect heat exchange relation with said second passage means along the entire length of said column, first conduit means interconnecting the lower end of said first passage means with said second passage means intermediate the opposite ends of said fractionating column, a heat exchanger, said first conduit means passing through said heat exchanger for subcooling hydrocarbon-enriched hydrocarbon-nitrogen liquid withdrawn from said first passage means in said initial fractionation zone, means in said first conduit means for throttling said subcooled hydrocarbon-enriched liquid therein prior to introduction into said second passage means in said fractionating column, means for withdrawing liquid hydrocarbon from the lower end of said second passage means in said fractionating column, second conduit means for passing a portion of said withdrawn liquid hydrocarbon through said heat exchanger for subcooling said liquid hydrocarbon, means for throttling and thereby further cooling said subcooled portion of liquid hydrocarbon, a condenser, means for passing nitrogen vapor from the upper end of said first passage means to said condenser, means for passing said throttled and further cooled hydrocarbon through said condenser in heat exchange relation with nitrogen therein, to condense said nitrogen and vaporize said hydrocarbon, means for introducing condensed nitrogen as reflux into said first passage means of said initial fractionation zone and into said second passage means in said fractionating column, means for withdrawing nitrogen vapor from said condenser, means for throttling and thereby further cooling said nitrogen vapor, means for passing said vaporized hydrocarbon through said heat exchanger and means for passing said throttled nitrogen vapor through said heat exchanger, both in heat exchange relation with said first conduit means containing said hydrocarbon enriched liquid, and with said second conduit means containing liquid hydrocarbon withdrawn from said second passage means, for subcooling said liquids as aforesaid.

13. A system as defined in claim 12, said means for passing said throttled nitrogen vapor through said heat exchanger comprising recycling means including a plurality of passageways in said heat exchanger, conduit means connecting said last-mentioned passageways in series, and work expansion means in said last-mentioned conduit means for work expanding and cooling nitrogen vapor during recycling thereof through said passageways.

14. A system as defined in claim 13, including a main heat exchanger, conduit means for passage of a compressed gas mixture of hydrocarbon and nitrogen through said main heat exchanger and communicating with the lower end of said first passage means in said initial fractionation zone, conduit means connecting the discharge end of said recycling means and passing through said main heat exchanger, conduit means connecting the lower end of said second passage means and passing through said main heat exchanger, and conduit means for passing exiting vaporized hydrocarbon from said first-mentioned heat exchanger, through said main heat exchanger.

References Cited
UNITED STATES PATENTS

| | | | |
|---|---|---|---|
| 2,122,238 | 6/1938 | Pollitzer | 62—39 |
| 2,499,043 | 2/1950 | Voorhees | 62—39 |
| 2,658,360 | 11/1953 | Miller | 62—31 |
| 2,677,945 | 5/1954 | Miller | 62—31 |
| 2,729,954 | 1/1956 | Etienne | 62—28 |
| 2,760,351 | 8/1956 | Schilling | 62—31 |
| 2,823,523 | 2/1958 | Eakin | 62—39 |
| 3,264,831 | 8/1966 | Jakob. | |
| 3,412,567 | 11/1968 | Smith | 62—39 |

WILBUR L. BASCOMB, JR., Primary Examiner

U.S. Cl. X.R.

62—39